United States Patent [19]

Miyake

[11] Patent Number: 4,733,753

[45] Date of Patent: Mar. 29, 1988

[54] LUBRICATOR WITH CHANNEL WHICH COMMUNICATES RESERVOIR WITH OIL DROP HOLE

[75] Inventor: Kouichi Miyake, Kani, Japan

[73] Assignee: CKD Kabushiki Kaisha, Aichi, Japan

[21] Appl. No.: 3,938

[22] Filed: Jan. 16, 1987

[30] Foreign Application Priority Data

Jan. 24, 1986 [JP] Japan .............................. 61-9471[U]
Feb. 24, 1986 [JP] Japan ............................ 61-25316[U]

[51] Int. Cl.$^4$ .............................................. F16N 7/34
[52] U.S. Cl. ................................... 184/55.1; 184/55.2
[58] Field of Search ..................... 184/55.1, 55.2, 57, 184/58; 261/DIG. 35

[56] References Cited

U.S. PATENT DOCUMENTS

| | | | |
|---|---|---|---|
| 3,023,849 | 3/1962 | Tine | 184/55.2 |
| 3,115,950 | 12/1963 | Malec | 184/55.2 |
| 3,411,609 | 11/1968 | German | 184/55.2 |
| 3,519,100 | 7/1970 | Semon | 184/55.1 |
| 3,707,204 | 12/1972 | Dussardier | 184/55.2 |
| 3,720,290 | 3/1973 | Lansky | 184/55.2 |
| 3,891,058 | 6/1975 | Scharfen | 184/55.2 |

Primary Examiner—Carlton R. Croyle
Assistant Examiner—Jane E. Obee
Attorney, Agent, or Firm—Robert E. Burns; Emmanuel J. Lobato

[57] ABSTRACT

A lubricator so constructed that a cover provided with a substantially horizontal air conduit including an orifice extending therethrough and formed in its upper side with a supply hole extending therethrough to the orifice is received on the oil cup, a transparent oil drop cylinder including a drop hole extending through its upper side is connected to the supply hole, an adjusting cap integrally provided with a needle valve downwardly projecting from the center of its upper side in alignment with the drop hole and serving to control an aperture of the drop hole is fitted around the oil drop cylinder through thread engagement with the cover or the drop cylinder, an oil reservoir within the oil cup is communicated with the drop hole, and a quantity of oil supplied to the drop hole and dropped through the drop hole into the oil drop cylinder under a suction effect of a pressure differential produced between a pressure acting on the oil surface within the oil cup and a pressure within the orifice is controlled by adjusting the aperture of the drop hole through rotation of the adjusting cap.

1 Claim, 4 Drawing Figures

LUBRICATOR WITH CHANNEL WHICH COMMUNICATES RESERVOIR WITH OIL DROP HOLE

BACKGROUND OF THE INVENTION

1. Field of the Invention

The present invention relates to a lubricator adapted to atomize lubricating oil into an air stream supplied to air-actuated devices such as an air cylinder or an air motor.

2. Description of the Prior Art

The lubricator commonly used is typically so constructed that a cover provided with a substantially horizontal air conduit including an orifice extending therethrough is received on the upper side of an oil cup, said cover is formed in its upper side with a supply hole extending to said orifice, a transparent oil drop cylinder having a drop hole through its top side is mounted on said cover so as to overlay said supply hole, a quantity of oil contained within the oil cup pulled upwards to a space above the oil drop cylinder under a suction effect of a pressure differential between within the oil cup and within the orifice is dropped through the drop hole into the oil drop cylinder and then atomized through the supply hole into the air stream flowing through the orifice. Means for adjusting a quantity of oil drop in the above-mentioned lubricator of prior art is, as disclosed in the specification of U.S. Pat. No. 3,707,204, so arranged that an outer cylinder communicatiing with a syphon tube adapted to pump up oil is fitted on the upper end of the oil drop cylinder, an adjustment screw provided on its lower end with a needle valve in alignment with the drop hole is threaded on cap means put on the upper side of said outer cylinder, an aperture of the drop hole is adjusted by rotating the adjustment screw and thereby a quantity of oil drop is adjusted. In such construction, upward projection of the adjustment screw results in increasing an overall height of the structure, which requires, in turn, a relatively large space for mounting, increased number of parts and disadvantageously increased manufacturing cost.

SUMMARY OF THE INVENTION

A lubricator of the present invention is characterized in that a transparent adjusting cap integrally provided with a needle valve downwardly projecting from a center of the upper side in alignment with a drop hole to control an aperture of the drop hole is fitted around an oil drop cylinder through threading on the oil drop cylinder or the cover and there is provided an air-tight channel adapted to communicate an oil reservoir within the oil cup with said drop hole through a gap defined between the oil drop cylinder and the adjusting cap, wherein, under a suction effect of a pressure differential produced between a pressure acting on the oil surface within the oil cup and a pressure prevailing within the orifice, a quantity of oil contained within the oil cup is pumped up through the channel and the gap between the oil drop cylinder and the adjusting cap into a space above the oil drop cylinder, and then is dropped through the drop hole into the oil drop cylinder. Simultaneously, the actual condition of the oil drop is visually monitored through the adjusting cap and the oil drop cylinder and said adjusting cap is rotated in a direction of screwing in or out so that the needle valve integrally projecting from the adjusting cap is moved upwards or downwards so as to increase or decrease the aperture of the drop hole for adjustment of the oil drop. The feature of the present invention that the adjusting cap fitted around the oil drop cylinder is provided with the needle valve integrally projecting therefrom and the aperture of the drop hole is adjusted by rotating the adjusting cap eliminates a demand for the adjustment screw and therefore keeps the overall height of the mechanism relatively low. Furthermore, the present invention makes it possible to reduce the mounting space, the number of parts and the manufacturing cost.

Figure 1:
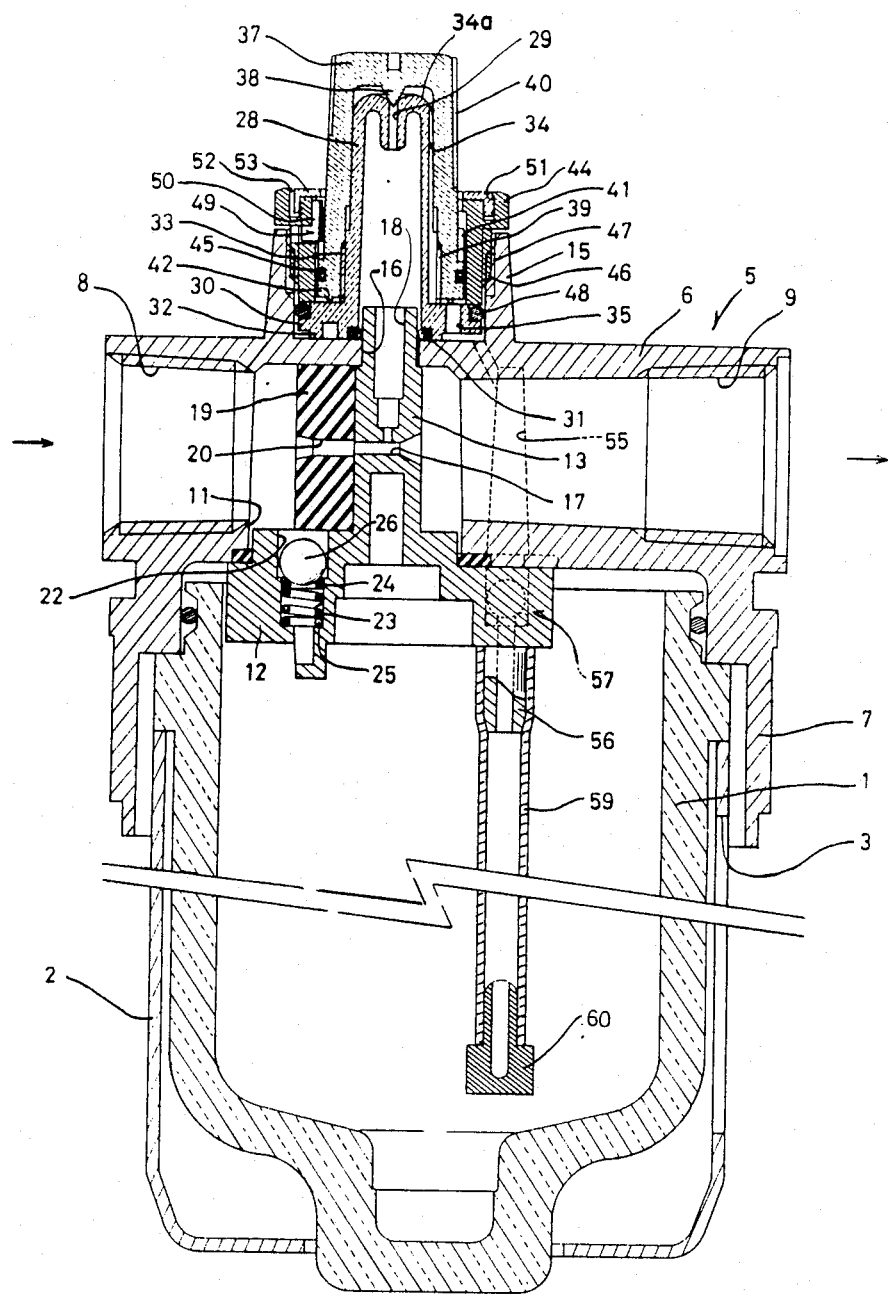
FIG. 1 is a sectional view illustrating one embodiment of the present invention.
Figure 2:
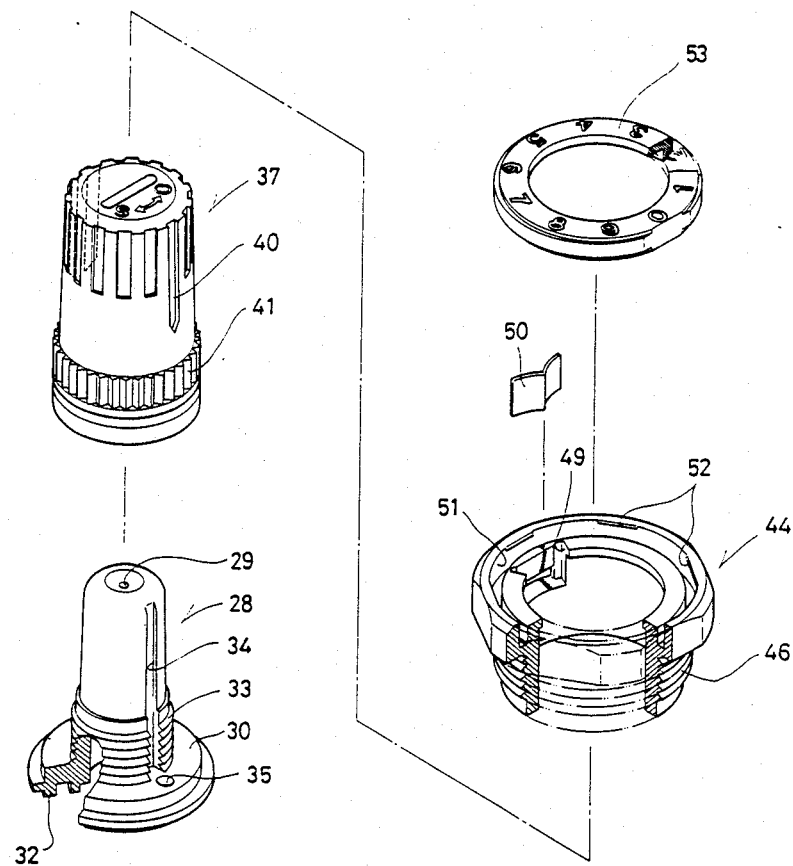
FIG. 2 is a disassembled perspectvie view illustrating in detail a mechanism for drop hole aperture adjustment in said embodiment.

DESCRIPTION OF THE PREFERRED EMBODIMENT:

Referring to FIGS. 1 and 2, an oil cup made of transparent resinous material and designated by reference numeral 1 has its outer periphery surrounded by a protective cylinder 2 which is, in turn, provided with a sight window 3. A die-cast cover 5 defining therein a horizontal conduit 6 is mounted on an upper side of said oil cup 1 in such a manner that a lid portion 7 formed on and extending downwards from lower side of said conduit 6 is received on the oil cup 1. Said conduit 6 extends between its inlet 8 at the left side and its outlet 9 at the right side as viewed in FIG. 1, and adapted to be connected into the air supply line. Lower wall of the conduit 6 is provided at a position slightly displaced from the middle point of the length of the conduit 6 towards the inlet 8 with a mounting bore 11 extending therethrough. A block 12 having a support 13 vertically extending upwards therefrom at a central position on the upper surface of the block 12 is received in said bore 11 and screw-fastened thereto so that said support 13 vertically extends through the conduit 6 and upper end of the support 13 projects through a central opening 16 formed in the bottom of a mounting cylinder 15 which is provided on the upper side of the conduit 6 integrally therewith. The support 13 is provided at a level corresponding to the axially central line of the conduit 6 with an orifice 17 extending in a flow direction and in upper portion of the support 13 with a supply bore 18 in a fluid communication with said orifice 17. Upstream of the support 13, a flow guide 19 is received in the conduit 6 so as to block said conduit 6 and to guide the air stream through a through-hole 20 to said orifice 17.

The above-mentioned block 12 is formed at a side upstream of the support 13 with a stepped passage 22 extending therethrough of which a diameter-reduced portion 23 defines a valve chamber 24 adapted to receive therein a coil spring 25. A ball 26 rests on the upper end of the coil spring 25 and normally opens the valve chamber 24, permitting pressure at the inlet 8 to act upon the interior of the oil cup 1, but, when pressure within the oil cup 1 is reduced as an oil inlet (not shown) thereof is opened to perform oil supply, closes the valve chamber 24 against resiliency of the coil spring 25 so that the oil supply can be smoothly performed without being prevented by air blowout from said oil inlet.

Within the mounting cylinder 15 formed on the upper side of said conduit 6, there is provided an oil drop cylinder 28 made of transparent resinous material which has a drop hole 29 formed through its top wall and a collar 30 extending around its lower end so that the inner periphery of said lower end is fitted on the upper end of said support 13 with interposition of an O-ring 31 and said collar 30 is received in the interior of the mounting cylinder 15. Legs 32 extending downwards from lower side of the collar 30 serves to maintain the collar 30 floating above the bottom of the mounting cylinder 15. The oil drop cylinder 28 is further provided around its lower end with a thread 33 and on its outer periphery with a longitudinal groove 34 extending from the upper end to the lower end. The collar 30 has a through-hole 35 just adjacent said longitudinal spline 34. An adjusting cap 37 similarly made of transparent resinous material is mounted around said oil drop cylinder 28. Specifically, the adjusting cap 37 is centrally provided on inner side of its top wall with a needle valve 38 projecting downwards integrally therefrom in alignment with said drop hole 29 and along the inner periphery of its lower end with a female thread 39 adapted to be engaged with the thread 33 of the oil drop cylinder 28 so that said adjusting cap 37 is rotatably mounted on said oil drop cylinder 28. There is defined between the top surface of the oil drop cylinder 28 and the adjusting cap 37 a space 34a which is in fluid communication with said longitudinal groove 34 formed in the oil drop cylinder 28. The opening of the drop hole 29 is reduced as the adjusting cap 37 is rotated in its screwing-in direction to move the needle valve 38 downwards while the opening of the drop hole 29 is enlarged as the adjusting cap 37 is rotated in its screwing-out direction to move the needle valve 38 upwards. The adjusting cap 37 further includes a pair of longitudinal indices 40 formed in on the outer periphery of its upper end spaced from each other by an angle of 180°, a serration 41 circumferentially provided thereon at a level slightly higher than the lower end, and a leg 42 projecting downwards from the bottom end surface of the adjusting cap 37 so as to rest on the upper surface of the collar 30 of said oil drop cylinder 28 and thereby defining a gap between the adjusting cap 37 and the collar 30. Around the lower end of said adjusting cap 37, a retainer ring 44 being relatively thick along its upper edge is received with interposition of an O-ring 45 so that a thread 46 formed in the outer periphery of said retainer ring 44 is engaged with a female thread 47 formed in inner periphery of the mounting cylinder 15. Bottom surface of said retainer ring 44 is thereby pressed against the top surface of the collar 30 of the oil drop cylinder 28 via an O-ring 48 so as to fix the oil drop cylinder 28 in place. Angle leaf spring 50 is disposed within a mounting recess 49 formed in the inner periphery of the retainer ring 44 at its upper end and the angle portion of said leaf spring 50 is engaged with said serration 41 of said adjusting cap 37. Annular dial 53 is forced into a correspondingly annular mounting groove 51 formed in the upper surface of the retainer ring 44 by deforming pawls 52 equiangularly formed along the open edge of said mounting groove 51 so that the outer periphery of the dial 53 is effectively prevented by the respective pawls 52 from being accidentally removed out of the mounting groove 51.

A side wall of the conduit 6 extending through said cover 5 is provided with a channel 55 vertically extending therethrough. Upper end of this channel 55 is in communication with a gap defined between the bottom of the mounting cylinder 15 and the lower surface of the collar 30 of the oil drop cylinder 28. Thus the upper end of the channel 55 is in fluid communication through the groove 34 with the space 34a between the upper end of the oil drop cylinder 28 and the cap 37. The lower end of the channel 55 communicates through a check valve 57 with an inlet 56 projecting from the lower surface of said block 12. Upper end of a syphon tube 59 of which a lower end immersed in a quantity of oil contained with the oil cup 1 is connected to said inlet 56 and a filter 60 is carried on said lower end of the syphon tube 59.

Now a the manner in which the present embodiment operates will be described.

When an air stream is supplied in the conduit 6, a part of the air stream is guided by the flow guide 19 to pass through the through-hole 20, then the orifice 17 towards the outlet 9 and a pressure differential between within the oil cup 1 and within the orifice 17 provides a suction effect under which a quantity of oil contained within the oil cup 1 flows through the syphon tube 59, the channel 55, the through-hole 35 formed in the collar 30 of the oil drop cylinder 28 and the longitudinal groove 34 to the space 34a above the upper surface of said oil drop cylinder 28. Then, oil drops through the drop hole 29 appropriately aperture-adjusted in accordance with a value carried on the dial 53 into the oil drop cylinder 28 and flows through the supply bore 18 into the orifice 17 so as to be atomized into the air stream.

In case of over-lubrication as due to leakage of oil from the air actuated device, the adjusting cap 37 may be rotated in a direction of screwing-in while the condition of oil dropping is visually monitored through the adjusting cap 37 and the oil drop cylinder 28 and thereby the needle valve 38 may be lowered towards the drop hole 29 to reduce the aperture of the drop hole 29 for a desired reduction of oil drop. Conversely, in case of insufficient lubrication, the adjusting cap 37 may be rotated in a direction of screwing-out out and thereby the needle valve 38 may be displaced upwards with respect to the drop hole 29 to enlarge the aperture thereof for desired increase of oil drop.

In accordance with the present embodiment, the adjusting cap 37 is provided therearound with the serration 41 into which the leaf spring 50 carried by the retainer ring 44 is engaged, so it is possible to hold the adjusting cap 37 at a position to which said adjusting cap 37 has been rotated and well controlled rotation of the adjusting cap 37 can be achieved.

In view of the fact that the dial 53 is provided separately of the retainer ring 44, zero-adjustment of the indices 40 can be accurately and reliably achieved by mounting the dial 53 in the retainer ring 52 with a number 0 thereon being aligned with the position occupied by one of the indices 40 after the adjusting cap 37 has been fully threaded in. Said indices 40 comprise a pair spaced from each other by an angle of 180°, so that even when one of these indices 40 happens to be positioned on rear side of the device or intercepted from the view field of an operator, the other index 40 may be utilized to read the dial.

Although the adjusting cap 37 is rotatably threaded to the oil drop cylinder 28 in the aforementioned embodiment, an alternative arrangement is also possible in which the adjusting cap 37 is threaded to the retainer ring 44.

Figure 3:
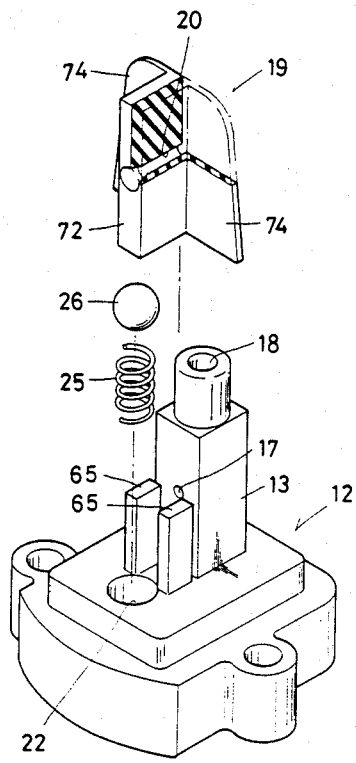
FIG. 3 is a disassembled perspective view illustrating a flow guide in said embodiment.
Figure 4:
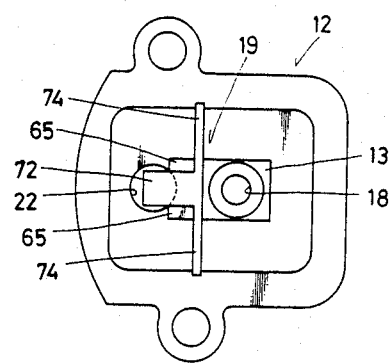
FIG. 4 is a plan view thereof.

Now a manner in which the flow guide 19 is mounted will be described in reference with FIGS. 3 and 4. This flow guide 19 comprises a rectangular parallelopipedon as a main body 72 made of rubber, having a height substantially corresponding to that of a square portion of the support 13 and a width narrower than that of said support 13. The body 72 includes the through-hole 20 extending in alignment with the orifice 17 and is provided on a downstream end of said body 72 with regulator plates 74, 74 which laterally extend from said downstream end in opposite sides, adapted to shut off gaps possibly defined between the body 72 and respective inner side walls of the conduit 6. Upstream of the support 13 formed on the upper surface of the block 12, there are provided a pair of relatively low mounting posts 65, 65 spaced from each other by the width of the body 72 of the flow guide 19 transversely of the flow direction and spaced from the support 13 by the thickness of said regulator plates 74. This flow guide 19 is inserted into the space between the support 13 and the mounting posts 65, 65 from above until the bottom of the body 72 rests on the upper surface of the block 12. Thus, the downstream lower end of the body 72 is so held between both mounting posts 65, 65 as to be restricted against a movement transversely of the flow direction, as seen in FIG. 4, while the lower ends of both regulator plates 74 are held at their roots between the mounting posts 65, 65 and the support 13 so as to be restricted against movement in the flow direction. In this way, the body 72 bears closely against the upstream end surface of said square portion of the support 13 with the through-hole 20 extending through the body 72 being aligned with the orifice 17.

In the present embodiment of the aforementioned construction, the air stream supplied into the conduit 6 is normally obstructed by the two regulator plates 74 of the flow guide 19 or, when a flow rate thereof is excessive, forcibly bends said regulator plates 74 so that said air stream may partially flow through the gaps thus established between the body 72 and the associated inner walls of the conduit 6, with a result that all or a major part of the air stream is guided through the through-hole 20 of the body 72 into the orifice 17. Mounting of the flow guide 19 in a place upstream of the support 13 may be achieved simply by inserting the flow guide 19 between the mounting posts 65 and the support 13 without use of fastening means such as screws.

As an additional convenience provided by the aforementioned embodiment, in a state after the flow guide 19 has been mounted upstream of the support 13, the upstream end of the body 72 lies just above the passage 22 and thereby serves also as a ball holder which prevents the ball 26 from springing out from said passage 22.

I claim:
1. A lubricator comprising:
an oil cup opened upwardly;
a cover through which an air conduit including an orifice extends substantially in a horizontal direction and which is received on upper side of said oil cup;
a supply hole formed in upper side of said cover and extending to said orifice;
a transparent oil drop cylinder including a drop hole extending through an upper side thereof and mounted on said cover so as to overlay said supply hole;
a transparent adjusting cap adapted to be fit around said oil drop cylinder and integrally provided with a needle valve downwardly projecting from a center of the upper side in alignment with said drop hole, said cap being adjustable axially of said oil drop cylinder in order to control an aperture of said drop hole; and
an air-tight channel adapted to communicate an oil reservoir within said oil cup with said drop hole through a space defined between an upper surface of said oil drop cylinder and said adjusting cap;
wherein a pressure differential produced between a pressure acting upon the oil surface within said oil cup and a pressure within said orifice provides a suction effect under which a quantity of oil within said oil cup flows through said channel to said space defined between an upper surface of said oil drop cylinder, then drops through said drop hole into said oil drop cylinder and is finally atomized through said supply hole into the air stream flowing through said orifice.

* * * * *